US012729055B2

(12) United States Patent
Ismert et al.

(10) Patent No.: US 12,729,055 B2
(45) Date of Patent: Sep. 8, 2026

(54) ROTATING RING TANK ATTACHMENT ADAPTER AND UNDERGROUND TANK SYSTEM

(71) Applicant: Striem LLC, Kansas City, KS (US)

(72) Inventors: Vincent Ismert, Kansas City, MO (US); Gabe Ismert, Shawnee Mission, KS (US); Montgomery Joneslight, Kansas City, KS (US); William Fordyce, Excelsior Springs, MO (US); Jacob Cole, Kearney, MO (US)

(73) Assignee: Striem LLC, Kansas City, KS (US)

( * ) Notice: Subject to any disclaimer, the term of this patent is extended or adjusted under 35 U.S.C. 154(b) by 30 days.

(21) Appl. No.: 19/005,340

(22) Filed: Dec. 30, 2024

(65) Prior Publication Data

US 2026/0184494 A1 Jul. 2, 2026

(51) Int. Cl.

*B65D 88/54* (2006.01)
*B65D 88/76* (2006.01)
*B67D 7/78* (2010.01)
*B65D 90/10* (2006.01)

(52) U.S. Cl.

CPC ............. *B65D 88/54* (2013.01); *B65D 88/76* (2013.01); *B67D 7/78* (2013.01); *B65D 90/105* (2013.01)

(58) Field of Classification Search

CPC ...... B65D 88/54; B65D 88/76; B65D 90/105; B67D 7/78
USPC ............................................. 220/567.4, 86.1
See application file for complete search history.

(56) References Cited

U.S. PATENT DOCUMENTS 3,433,258 A * 3/1969 031969 ................... E03F 11/00 126/362.1
4,135,636 A * 1/1979 Rudbach ................ B65D 88/54 217/111
4,144,901 A * 3/1979 Stevenson ............... F16K 51/00 222/400.7

(Continued)

FOREIGN PATENT DOCUMENTS

CN 102040060 B 11/2014
EP 0288781 B1 7/1992

(Continued)

OTHER PUBLICATIONS

The Tank Shop, 3750 Litre GRAF CARAT Direct Underground Rainwater Harvesting System (Home & Garden), Webpage <https://thetankshop.co.uk/products/graf-carat-3750-litre-underground-flat-tank-rainwater-harvesting-system-eco-plus>, 2025, 7 pages.

(Continued)

*Primary Examiner* — Nathan J Jenness
*Assistant Examiner* — Jennifer Castriotta
(74) *Attorney, Agent, or Firm* — HOVEY WILLIAMS LLP

(57) ABSTRACT

A connection adapter for incorporating in a riser stack of an underground tank includes a first portion, a flange portion, and a pipe stub. The first portion has a bottom end and a top end opposite the bottom end. The bottom end has an outer diameter sized to fit within an accessway of the underground tank. The flange portion is connected to the top end of the first portion. The pipe stub is in fluid communication with the first portion and externally protrudes from the first portion. The pipe stub is integrally formed with the first portion and has an integrally formed distal end wall caps the pipe stub.

16 Claims, 13 Drawing Sheets

(56) References Cited

U.S. PATENT DOCUMENTS

| | | | | | |
|---|---|---|---|---|---|
| 4,639,164 | A | | 1/1987 | Pugnale et al. | |
| 4,884,709 | A | * | 12/1989 | McCarthy ............ | B65D 90/105<br>220/567.1 |
| 5,052,217 | A | | 10/1991 | Sharp | |
| 5,058,633 | A | * | 10/1991 | Sharp ................... | B65D 90/105<br>220/86.1 |
| 5,217,052 | A | | 6/1993 | Sharp | |
| 2005/0205580 | A1 | | 9/2005 | Zais et al. | |

FOREIGN PATENT DOCUMENTS

| | | | |
|---|---|---|---|
| EP | 1894857 | B1 | 12/2008 |
| KR | 0418810 | Y1 | 6/2006 |

OTHER PUBLICATIONS

Izoplas, Underground Water Tanks, Webpage <https://izoplas.com/en/underground-water-tanks/>, 2025, 13 pages.
Tank Depot, 5100 Gallon Plastic Underground Water Storage Cistern Tank System, Webpage <https://www.tank-depot.com/graf-rainharvest-systems-90-inch-long-1700-gallon-plastic-underground-water-storage-cistern-tank-graf-372005>, 2024, 4 pages.

* cited by examiner

ROTATING RING TANK ATTACHMENT ADAPTER AND UNDERGROUND TANK SYSTEM

BACKGROUND OF THE INVENTION

Industrial and commercial sites, such as car washes, often have underground tanks designed to reclaim water. The tanks are used to filter out solids, oil, and/or other pollutants from the water stream so the water can be reused. The tanks are placed below grade and holes are formed in the tanks to provide connections to overflow tanks and/or pump lines. However, when the tanks are buried, settling earth, backfill, and other external forces often cause leaks or vacuum breaks in the tanks, pump lines, and/or connections therebetween. Additionally, vibration forces generated by pumps can negatively affect the tank or the tank connection.

Thus, there is a need for improved connection means and improved tank systems. This background discussion is intended to provide information related to the present invention which is not necessarily prior art.

SUMMARY OF THE INVENTION

Embodiments of the current invention address one or more of the above-mentioned problems and provide a distinct advance in the art of underground tank connection adapters, underground tank systems, and methods of installing the same.

A connection adapter according to an embodiment of the present invention is for incorporating in a riser stack of an underground tank. The connection adapter includes a first portion, a flange portion, and a pipe stub. The first portion has a bottom end and a top end opposite the bottom end. The bottom end has an outer diameter sized to fit within an accessway of the underground tank. The flange portion is connected to the top end of the first portion.

The pipe stub is in fluid communication with the first portion and externally protrudes from the first portion. The pipe stub is integrally formed with the cylindrical portion and has an integrally formed distal end wall that caps the pipe stub. The pipe stub enables a water/gas tight seal to the external environment and allows an uninterrupted run of pipe to run from the source to the inside of the tank without breaks. This is especially useful and important for pump lines as it enables removing points for leaks or vacuum breaks. It further enables connection types that allow external piping to settle with backfill and other external forces. It further enables connection types with external piping that resists vibration forces of pumps, for example, without negatively affecting the tank or tank connection.

Another embodiment of the invention is a tank system that includes a tank and a connection adapter. The tank has a top end with an accessway neck extending from the top end and defining an accessway opening. The connection adapter is coupled to the accessway opening and includes a cylindrical portion, a flange portion, and a pipe stub. The cylindrical portion has a bottom end and a top end opposite the bottom end. The bottom end has an outer diameter sized to fit within the accessway opening of the tank. The flange portion is connected to the top end of the cylindrical portion. The pipe stub is in fluid communication with the cylindrical portion and externally protrudes from the cylindrical portion. The pipe stub has a distal end that is capped.

Another embodiment of the invention is a method of installing a water reclamation tank. The method includes positioning a first connection adapter in fluid communication with a first tank. The first tank has a top end with an accessway neck extending from the top end and defining an accessway opening. The first connection adapter includes a cylindrical portion having a bottom end and a top end opposite the bottom end, a flange portion connected to the top end of the cylindrical portion, and a pipe stub in fluid communication with the cylindrical portion and externally protruding from the cylindrical portion. The pipe stub has a distal end that is capped. The method further includes positioning the first connection adapter so that the pipe stub thereof extends in a first direction; removing a portion of the distal end of the pipe stub; and inserting piping into the pipe stub.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
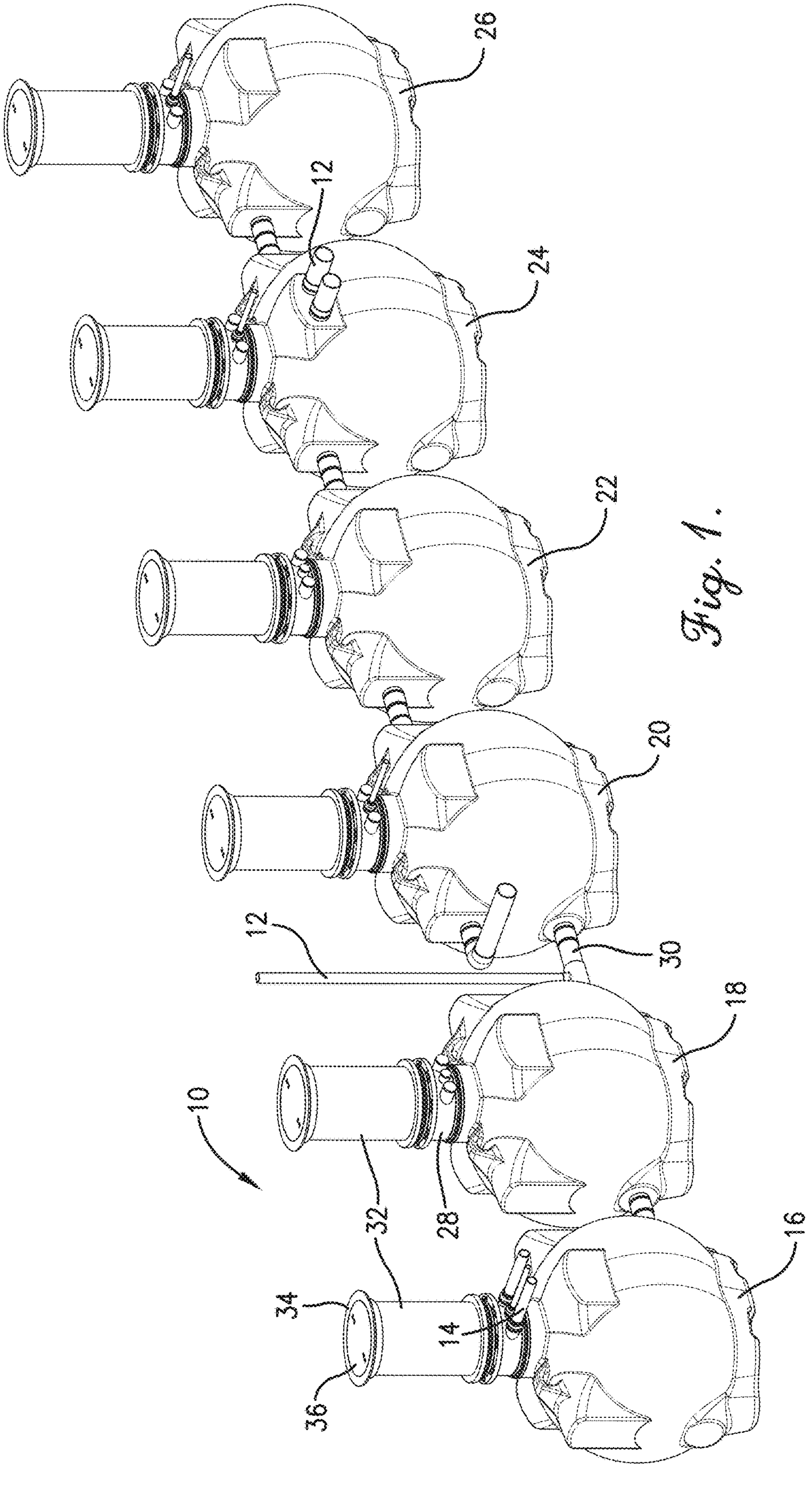
FIG. 1 is a perspective view of a tank system constructed according to an embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Turning to FIG. 1, a tank system 10 constructed according to an embodiment of the invention is operable to reclaim water from one or more external runs and is operable to be in fluid communication with one or more vent stacks 12 and/or one or more pump lines or other external lines 14. The tank system 10 includes one or more tanks 16, 18, 20, 22, 24, 26 with one or more connection adapters 28. The tanks 16, 18, 20, 22, 24, 26 may be in fluid communication with one another through various ports in the tanks 16, 18, 20, 22, 24, 26 and piping 30 connecting them. For example, tanks 16, 18, 20 may be primary tanks, and tanks 22, 24, 26 may be overflow tanks. While the tanks 16, 18, 20, 22, 24, 26 are depicted as being aligned along a single horizontal axis, embodiments of the present invention enables them to be arranged any number of ways. For example, one or more of the tanks may be at different relative elevations and/or positioned along another horizontal axis that is transverse to the axis along which the other tanks are aligned. The tank system 10 may include riser sections 32 coupled to the connection adapters 28 for providing access at grade. The top ends of the riser sections 32 may accompany accessway frames 34 and covers 36.

Figure 2:
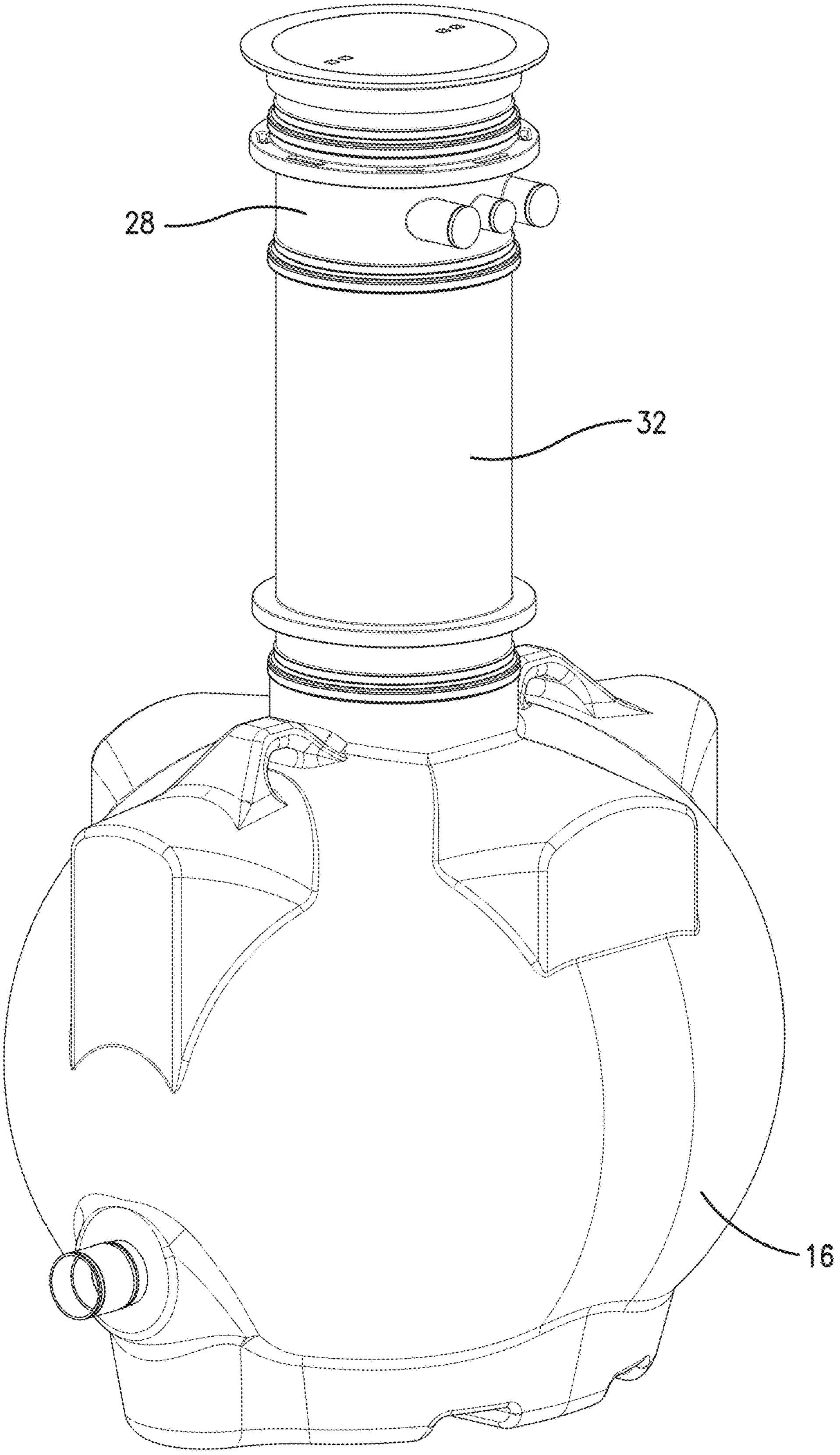
FIG. 2 is a perspective view of a tank and riser stack of the tank system of FIG. 1 with a connection adapter located at a higher relative elevation.
Figure 3:
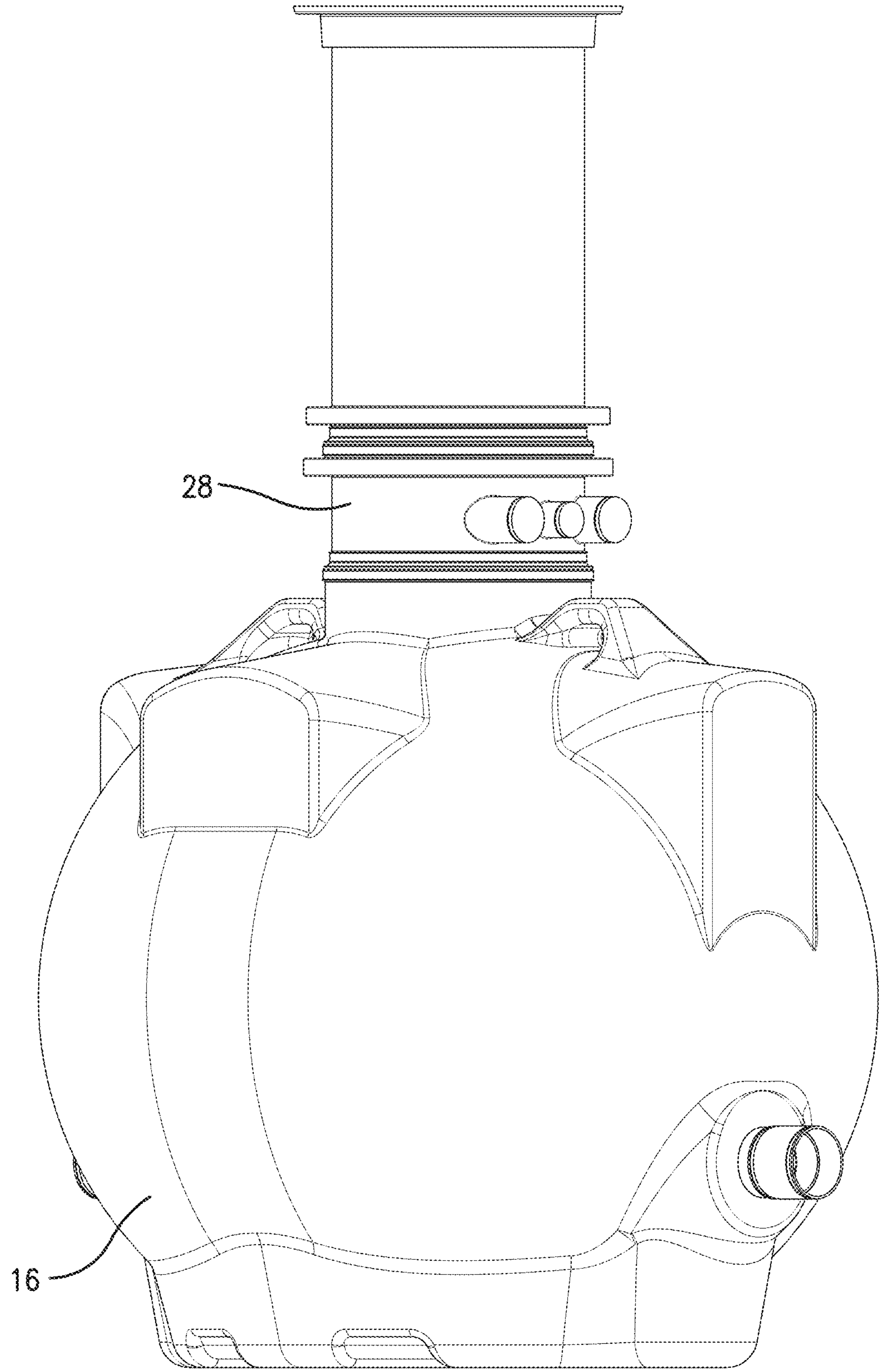
FIG. 3 is a perspective view of another tank and riser stack of the tank system of FIG. 1 with a connection adapter rotated about a central vertical axis relative to the tank.

While FIG. 1 depicts the connection adapters 28 being positioned beneath the riser sections 32, the connection adapters 28 may be positioned at any elevation without departing from the scope of the present invention. In one or more embodiments, the connection adapters of different tanks may be positioned at different elevations and/or oriented in different horizontal directions. For example, as shown in FIG. 2, the connection adapter 28 is positioned above the riser section 32, which generally extends from one of the tanks 16. Additionally, the connection adapters 28 may be rotated relative to their corresponding tanks 16 about a vertical axis so that they face any horizontal direction, as depicted in FIG. 3.

Figure 4:
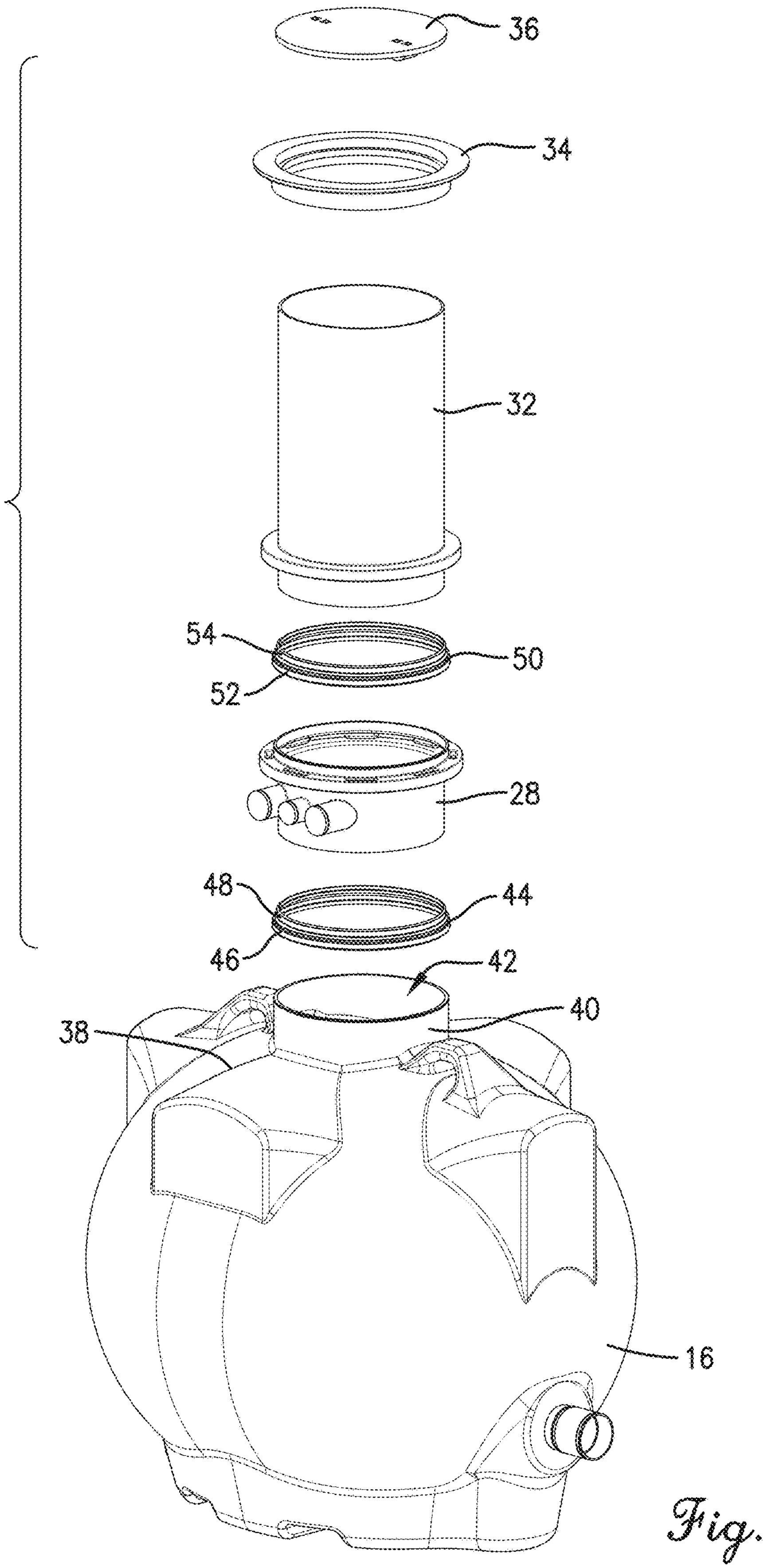
FIG. 4 is an exploded view of one of the tanks and riser stacks of the tank system of FIG. 1.

Turning to FIG. 4, the tanks 16 may have a top end 38 with an accessway neck 40 extending from the top end 38 and defining an accessway opening 42. A bottom gasket 44 may be positioned between the connection adapter 28 and the tank 16. The bottom gasket 44 may have a bottom end 46 sized to receive the accessway neck 40 of the tank 16 and a top end 48 sized to receive a bottom portion of the connection adapter 28. The connection adapter 28 is operable to sit in the bottom gasket 44, and a top gasket 50 sits on the connection adapter 28. The top gasket 50 may be substantially similar to bottom gasket 44 and have a bottom end 52 sized to receive a top portion of the connection adapter 28 and sit on a flange portion thereof (discussed in more detail below). The riser section 32 is received into a top end 54 of the top gasket 50 and supports the accessway frame 34, which holds the cover 36. In one or more embodiments, a clamping system, such as steel bands, may be used to secure the gaskets 44, 50 to corresponding components of the riser stack. A top end of the riser section 32 is inserted through a bottom opening of the accessway frame 34, and the cover 36 is securable and seated in the top end of the accessway frame. As discussed above, the connection adapter 28, gaskets 44, 50, riser section 32, accessway frame 34, and cover 36 may be arranged any number of ways without departing from the scope of the present invention. Additionally, it is foreseen that multiple connection adapters and/or riser sections may be implemented into a riser stack without departing from the scope of the present invention.

Figure 5:
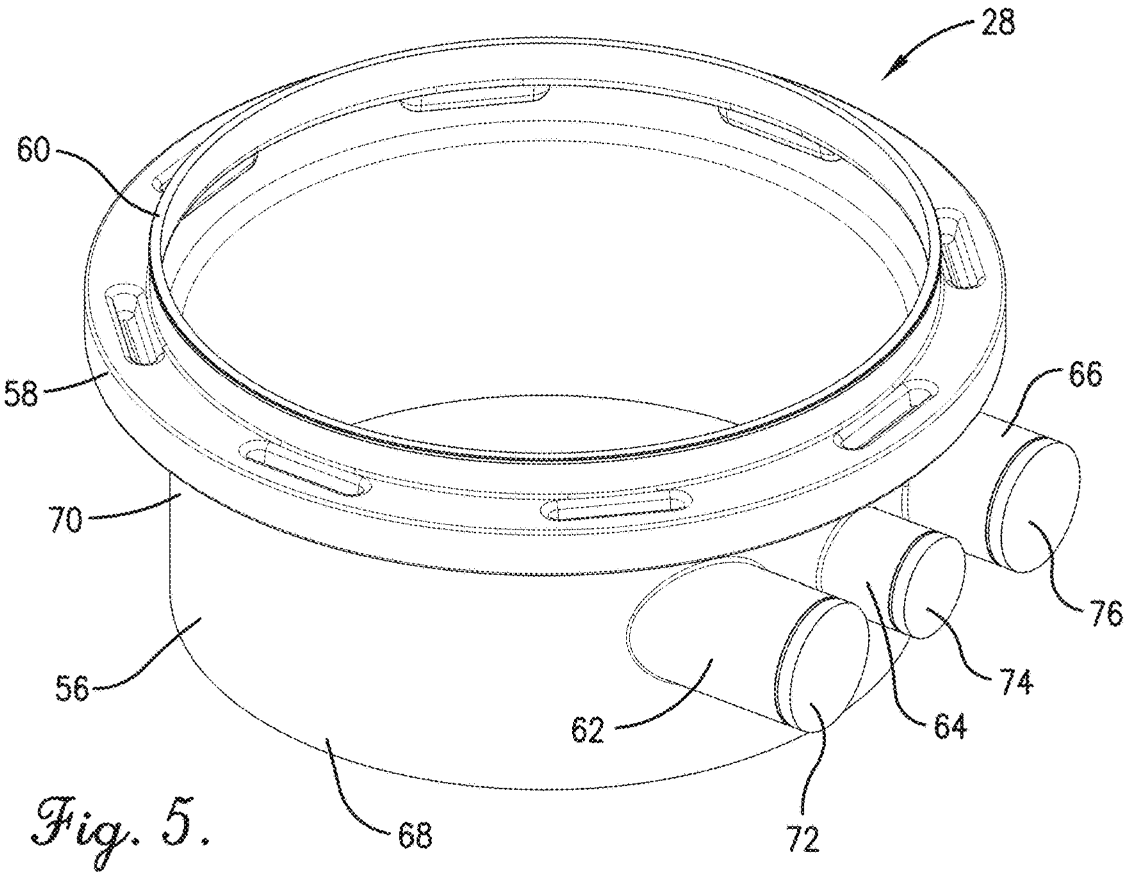
FIG. 5 is a perspective view of a connection adapter of the tank and riser stack of FIG. 4.

Turning to FIG. 5, the connection adapter 28 broadly comprises a first cylindrical portion 56, a flange portion 58, a second cylindrical portion 60, and one or more pipe stubs 62, 64, 66. The first cylindrical portion 56 has a bottom end 68 and a top end 70 opposite the bottom end 68. The bottom end 68 has an outer diameter sized to fit within the bottom gasket and the accessway opening of the tank.

The flange portion 58 is connected to the top end 70 of the first cylindrical portion 56. The second cylindrical portion 60 extends from the top end of the flange portion 58. In one or more embodiments, the flange portion 58 and/or the second cylindrical portion 60 have outer diameters that are longer than the outer diameter of the first cylindrical portion 56. Additionally, the inner diameters of the flange portion 58 and/or the second cylindrical portion 60 are longer than the inner diameter of the first cylindrical portion 56. However, the outer diameter of the second cylindrical portion 60 is sized to be received within the top gasket. Thus, the cylindrical portions 56, 60 define interfaces that allow the connection adapter 28 to be installed at any elevation between the cover and the tank.

Figure 6:
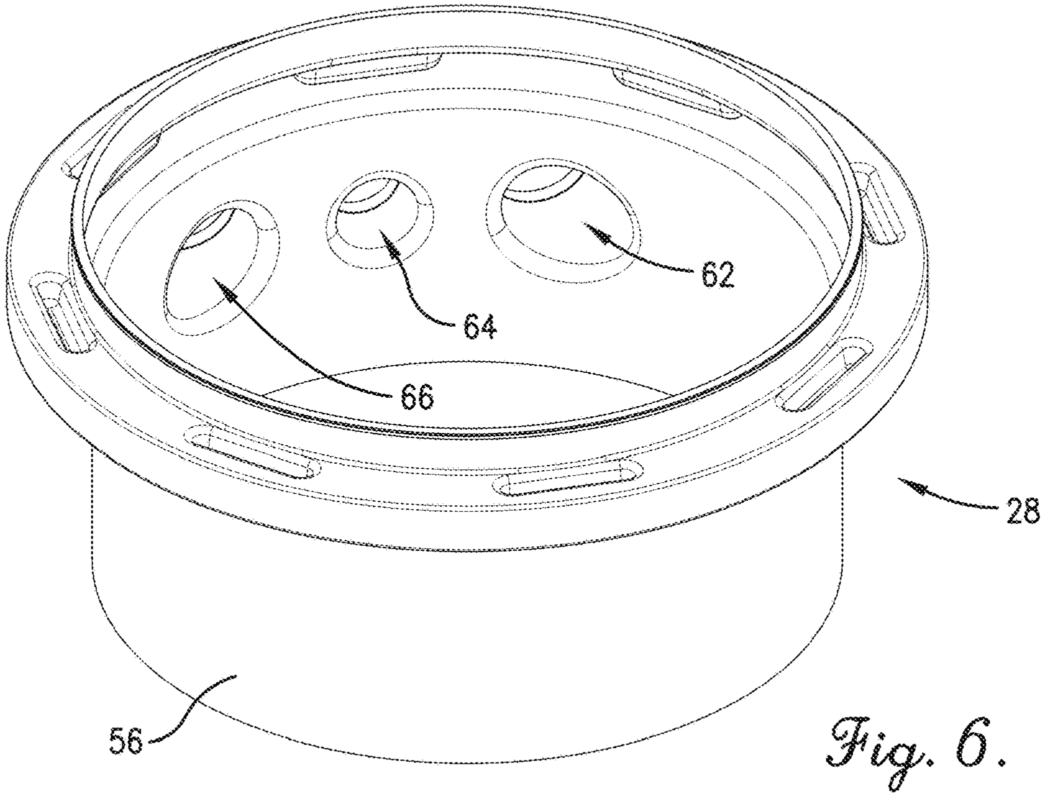
FIG. 6 is a rear perspective view of the connection adapter of FIG. 5.

The pipe stubs 62, 64, 66 are in fluid communication with the interior space defined by the cylindrical portion 56 (as depicted in FIG. 6) and externally protruding from the cylindrical portion 56. As shown in FIG. 5, the pipe stubs 62, 64, 66 have distal ends 72, 74, 76 that cap their respective pipe stubs 62, 64, 66. The distal ends 72, 74, 76 may be walls that are integrally formed or molded with their respective pipe stubs 62, 64, 66. Alternatively or additionally, one or more of the distal ends 72, 74, 76 may be separate, distinct pieces that are secured to the pipe stubs 62, 64, 66. The pipe stubs 62, 64, 66 are sealed so that a user of the connection adapter 28 may or may not select to use one or more of the pipe stubs 62, 64, 66 for receiving an external line. If the user selects to not use one or more of the pipe stubs 62, 64, 66, then the capped pipe stubs 62, 64, 66 maintain a strong seal.

In one or more embodiments, the pipe stubs 62, 64, 66 are integrally formed with the cylindrical portion 56. The integrally formed pipe stubs 62, 64, 66 and cylindrical portion 56 may be molded. In one or more embodiments, the pipe stubs 62, 64, 66 and cylindrical portion 56 are formed of plastic. The flange portion 58 and second cylindrical portion 60 may likewise integrally formed with the cylindrical portion 56 and pipe stubs 62, 64, 66 so that the connection adapter 28 is of unitary construction.

While the connection adapter 28 is depicted as having three pipe stubs 62, 64, 66, the connection adapter 28 may include any number of pipe stubs without departing from the scope of the present invention. In one or more embodiments, the pipe stubs 62, 64, 66 extend parallel to one another from the cylindrical portion 56. The pipe stubs 62, 64, 66 may have varying, or the same, diameters that are representative of standard plumbing connections. In one or more embodiments, the middle pipe stub 64 has an inner diameter that is shorter than inner diameters of the exterior pipe stubs 62, 66.

Figure 7:
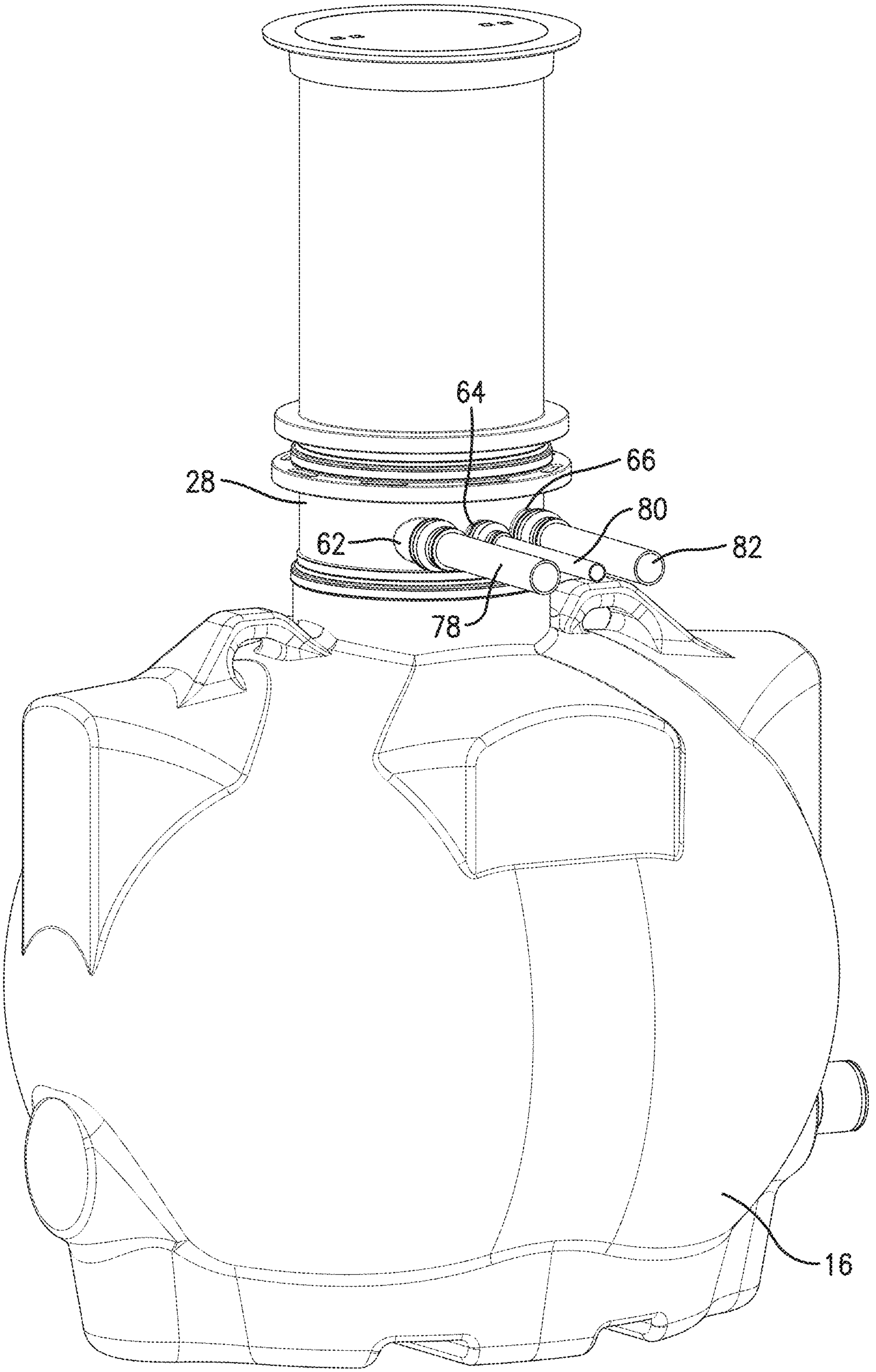
FIG. 7 is another tank and riser stack of the tank system of FIG. 1 with a connection adapter having distal ends of pipe stubs removed and piping extending into the pipe stubs.
Figure 8:
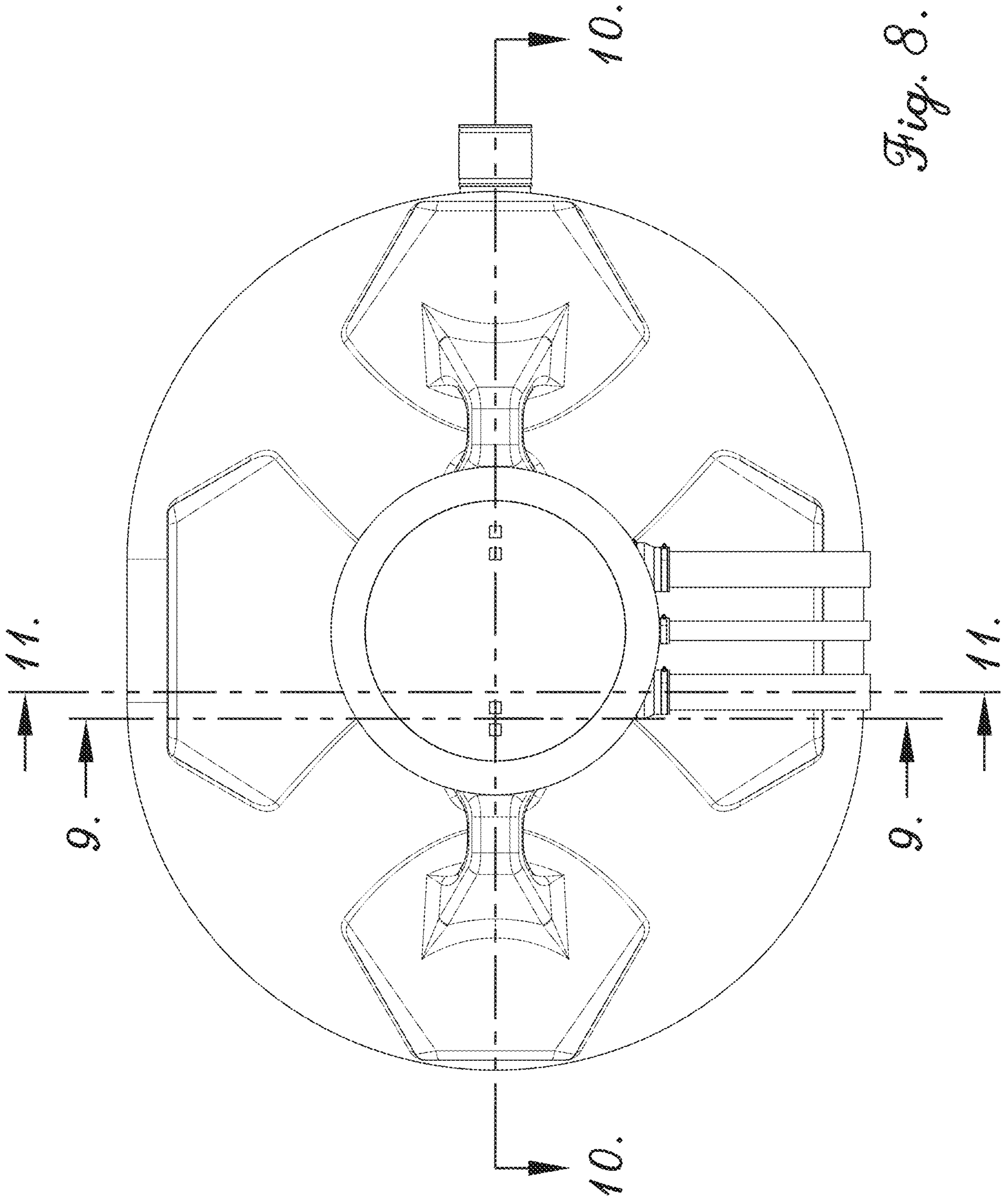
FIG. 8 is a top plan view of the tank and riser stack of FIG. 7.
Figure 9:
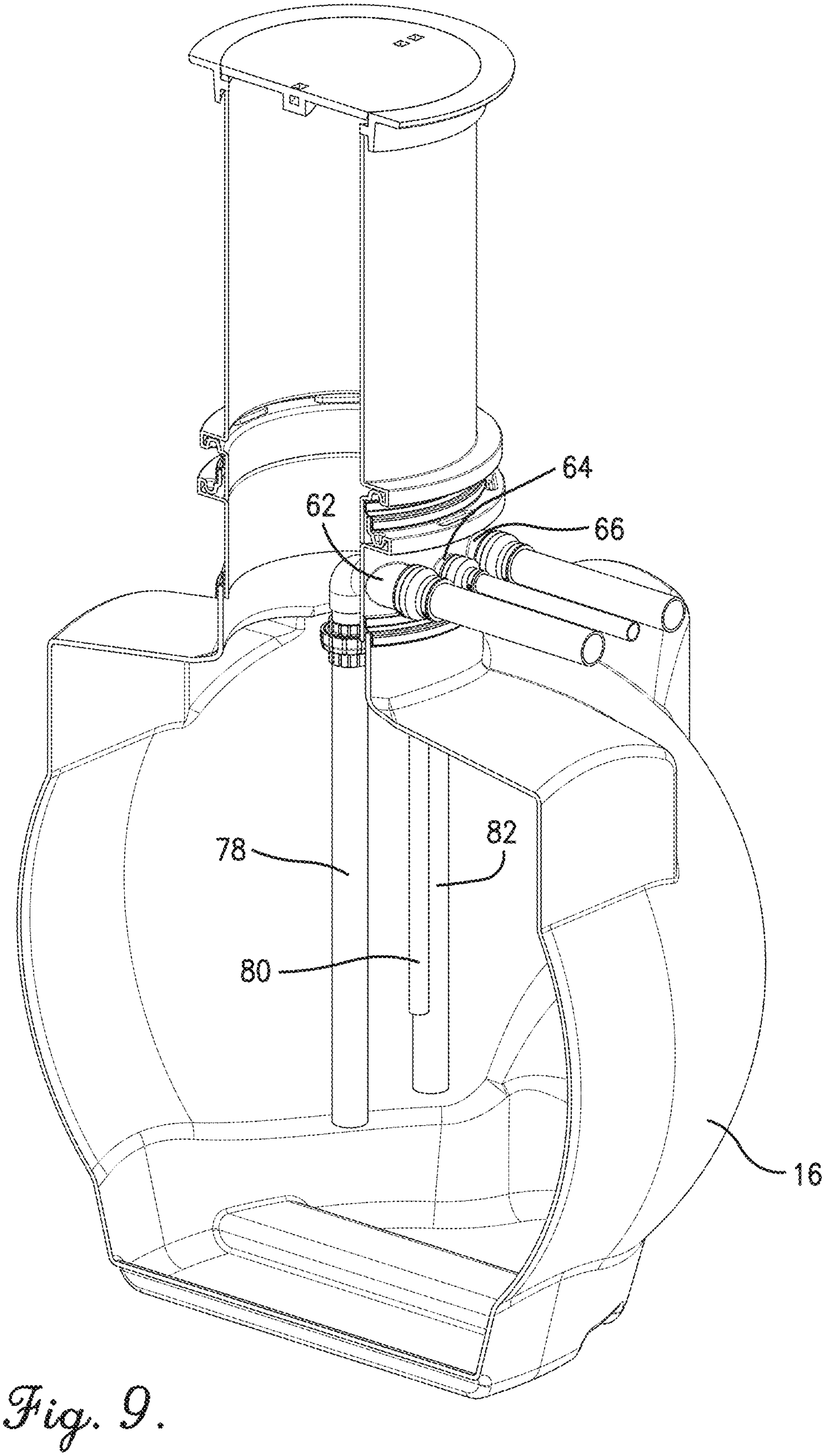
FIG. 9 is a sectional view of the tank and riser stack of FIG. 8 along line 9-9.
Figure 10:
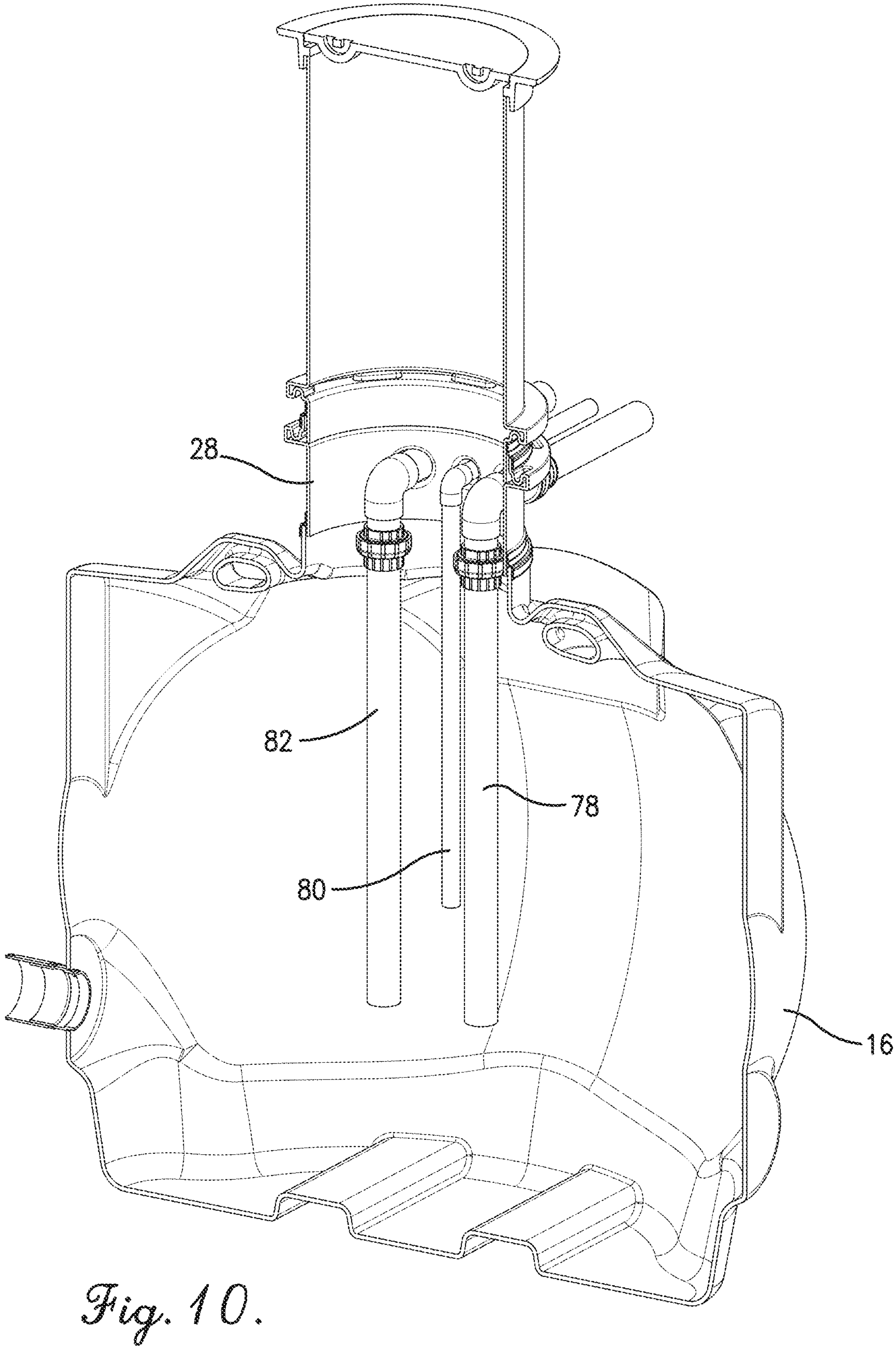
FIG. 10 is a sectional view of the tank and riser stack of FIG. 8 along line 10-10.
Figure 11:
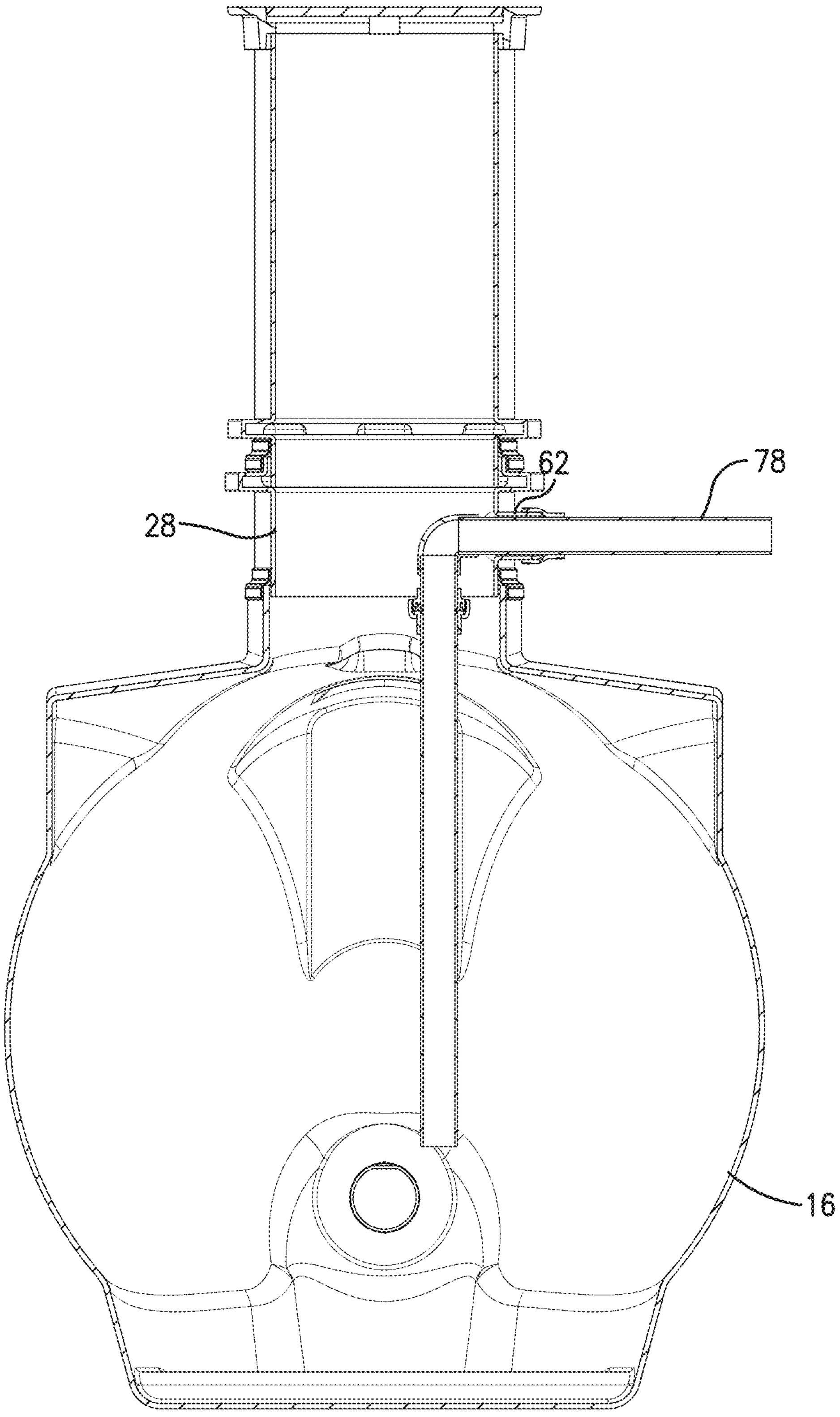
FIG. 11 is a side sectional view of the tank and riser stack of FIG. 8 along line 11-11.

Turning to FIG. 7 the pipe stubs 62, 64, 66 act as connection points for an external plumbing system. The connection adapter 28 is free to rotate three hundred sixty degrees about a vertical axis to accept external lines 78, 80, 82 from any direction. The external lines 78, 80, 82 may have diameters corresponding to the diameters of their respective pipe stubs 62, 64, 66. For example, the external line 80 may have a smaller diameter to fit into the smaller diameter of the middle pipe stub 64. As depicted in FIGS. 8-11, the pipe stubs 62, 64, 66 may be cut to form open-ended pipe stubs 62, 64, 66 that receive piping of the external lines 78, 80, 82. The piping extends through the open-ended pipe stubs 62, 64, 66 into the interior of the tank 16.

Figure 12:
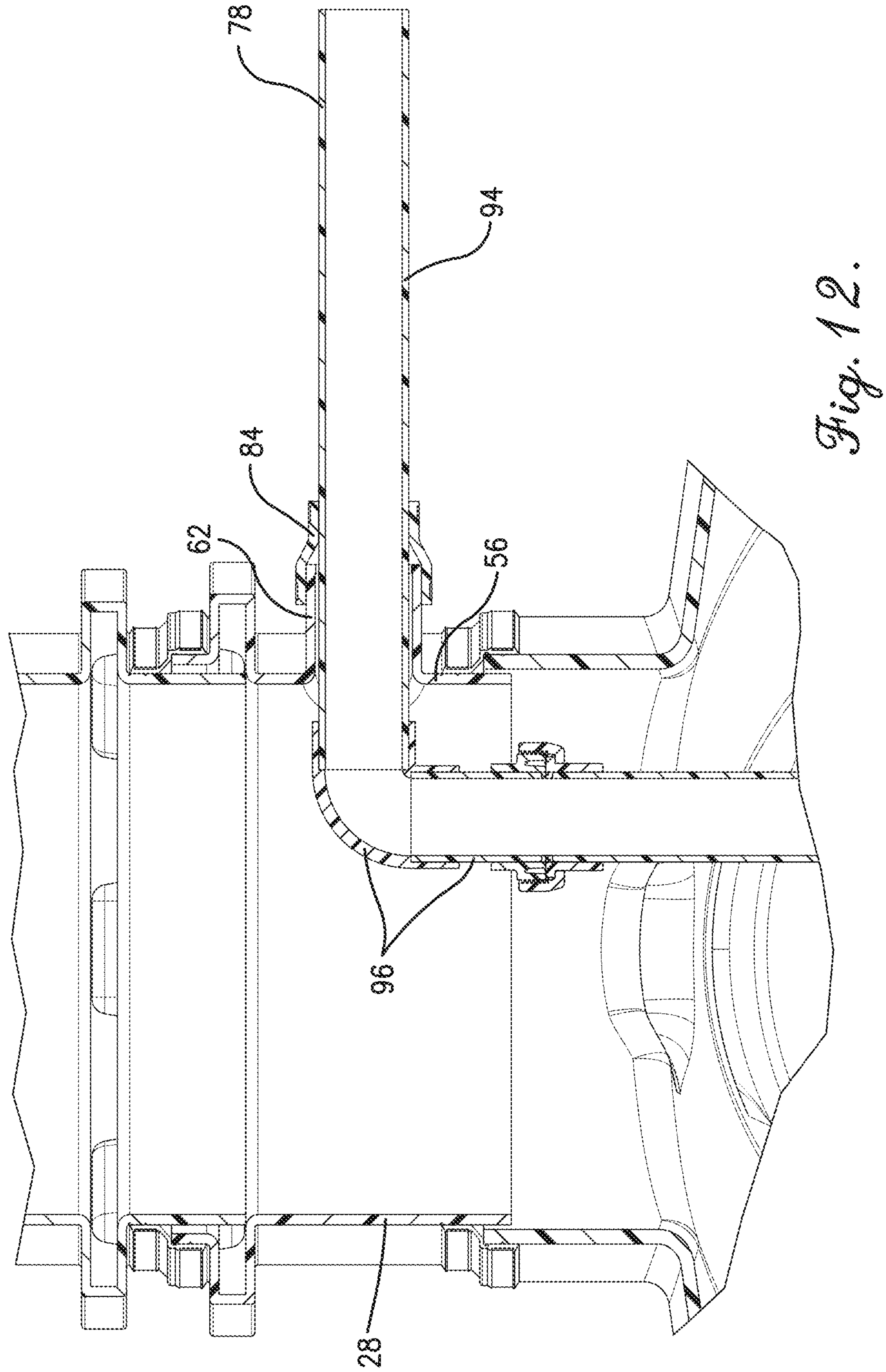
FIG. 12 is an enlarged view of the connection adapter and piping of the tank and riser stack of FIG. 11.

As shown in FIG. 12, the tank system may further comprise one or more flexible couplers 84 that enables the piping 78 to include a single section of piping 94 to extend all the way through the pipe stub 62 into the interior portion of the first cylindrical portion 56 of the connection adapter 28. Suitable piping 96 may be connected to the single section of piping 94 and extend downward into the tank in order to, for example, provide a line to pump water out of and/or into the tank.

Figure 13:
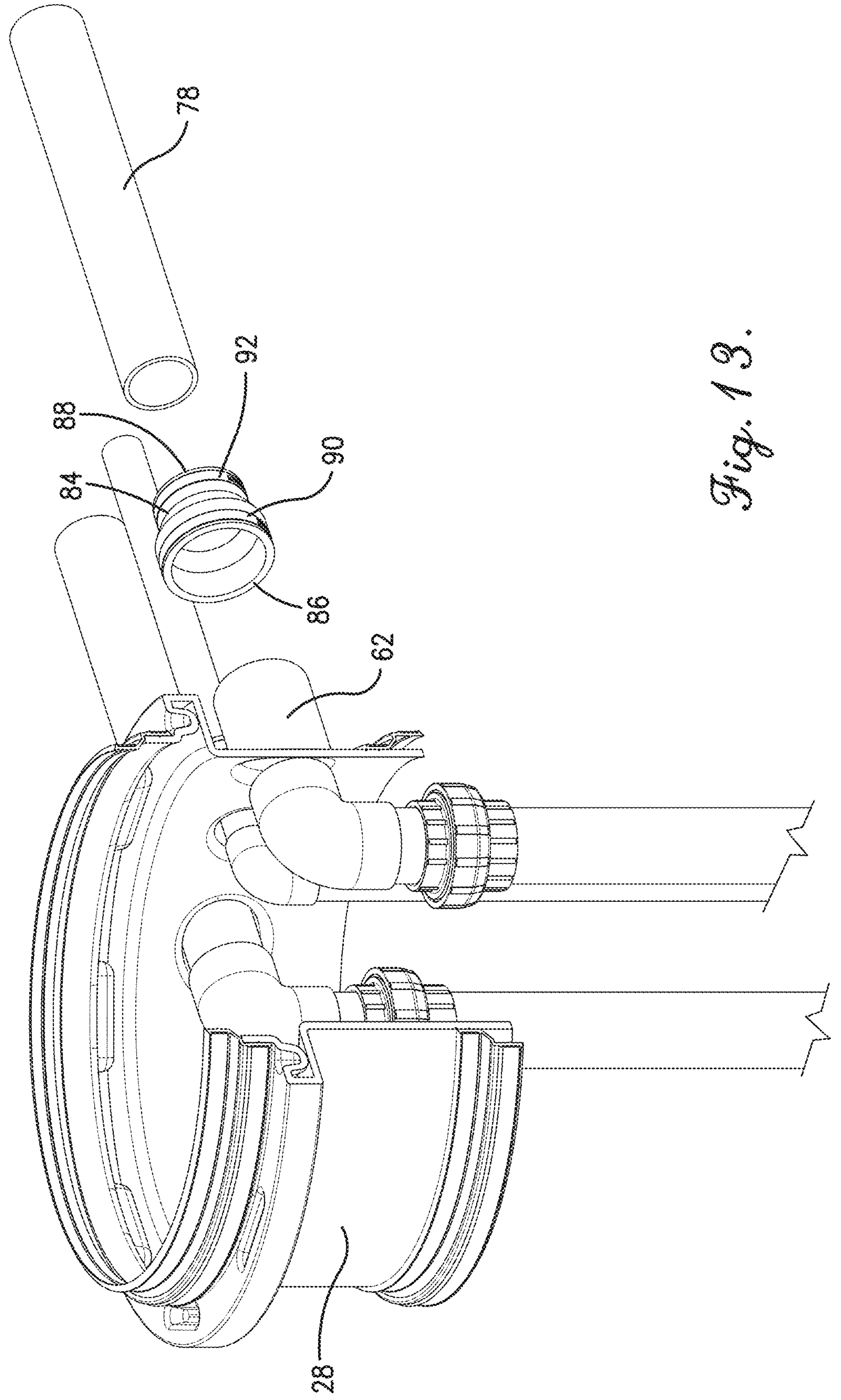
FIG. 13 is an enlarged cut away view of the connection adapter of FIG. 12 with an exploded view of the piping.

Turning to FIG. 13, the one or more flexible couplers 84 include a first end 86 that receives the open-ended pipe stub 62 and a second end 88 that receives the piping 78. The coupler 84 may be made of flexible material and include one or more clamping systems 90, 92, such as steel bands or worm clamps. The coupler 84 interface with connection adapter 28 and piping 78 help absorb settling and vibration forces while maintaining a sealed connection between the adapter 28 and the tank.

In use, when the user receives the connection adapter 28, they can choose which pipe stubs 62, 64, 66 they need to use, cut them in the field, and then connect their on-site piping 78, 80, 82 to the unit. The on-site piping 78, 80, 82 can be laid in a continuous run through the pipe stubs 62, 64, 66 and into the tank internals. This is important because it eliminates a connection point and potential leak point for pump applications. The connection interface between the connection adapter 28 and the site piping 78, 80, 82 is achieved by using the reducing mechanical couplers 84, which are connected to the outer diameters of the pipe stubs 62, 64, 66, and the outer diameters of the site piping 78, 80, 82 that runs through the connection adapter 28 and into the system 10. This connection methodology also allows flexibility in the connection that will accommodate settling of pipes after installation from earth settling, and damper vibrations from pump applications.

The system 10 is modular and can include any number of tanks arranged any number of ways. The system 10 uses the flexibility of the amount, size, and orientation of the connection adapters 28 and their pipe stubs 62, 64, 66 in order to achieve this modularity.

Figure 14:
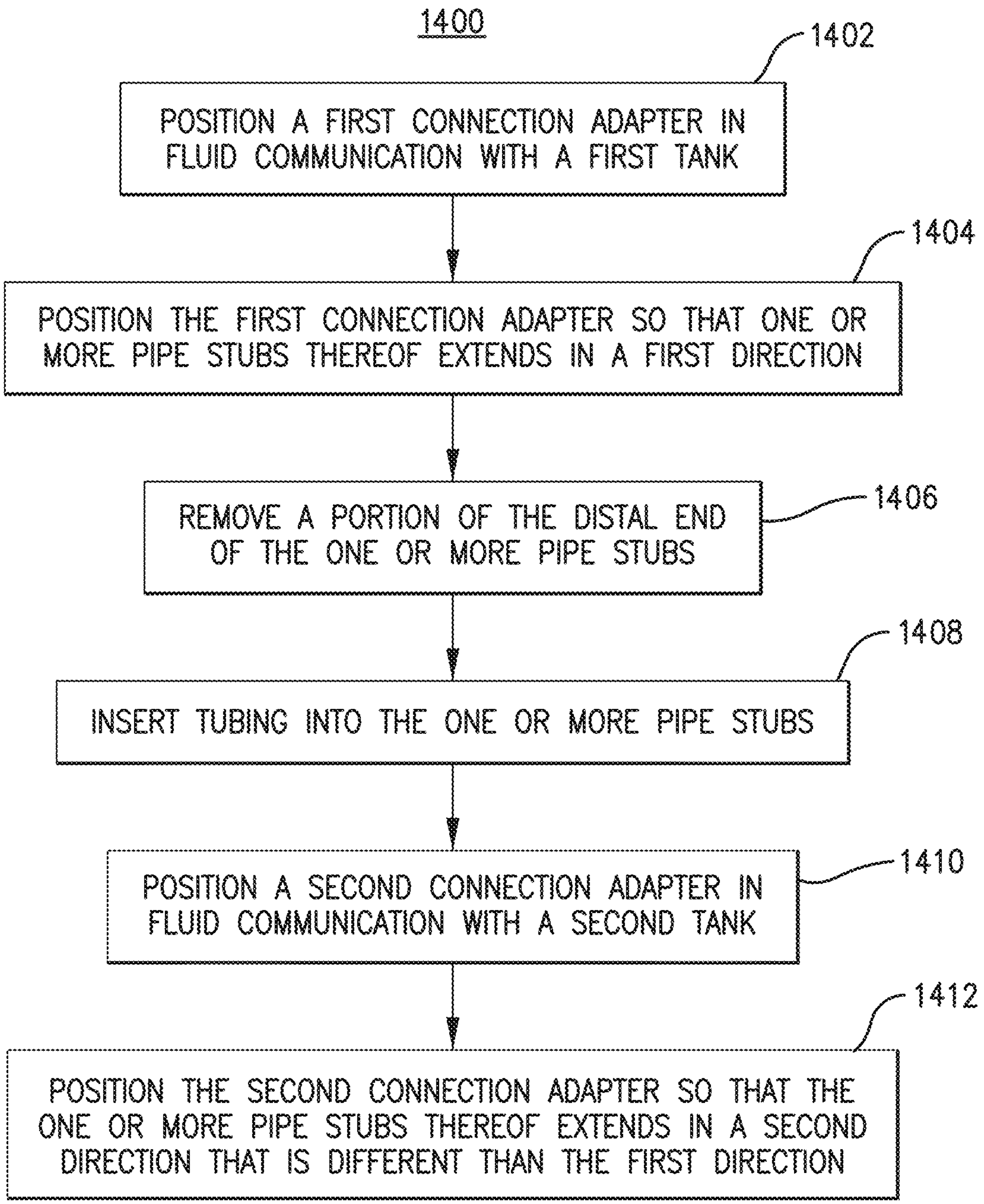
FIG. 14 is a flowchart depicting exemplary steps of a method according to an embodiment of the present invention.

The flow chart of FIG. 14 depicts the steps of an exemplary method 1400 of installing one or more underground tanks. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order depending upon the functionality involved. In addition, some steps may be optional.

Referring to step 1402, a first connection adapter is positioned in fluid communication with a first tank. The first connection adapter and first tank may be substantially similar to the connection adapters and tanks described elsewhere herein. In one or more embodiments, this step includes positioning the first tank in place. This step may further include placing a gasket on the accessway neck of the tank and placing the first connection adapter in the gasket. Additionally or alternatively, this step may include coupling a riser section to the accessway neck of the tank, placing the gasket on the riser section, and placing the first connection adapter in the gasket.

Referring to step 1404, the first connection adapter is positioned so that the one or more pipe stubs thereof extends in a first direction. This may include rotating the first connection adapter about a vertical axis so that the pipe stubs align with the first direction. The pipe stubs may be oriented so that they face on-site piping. This step may include tightening one or more clamping systems on the gaskets coupled to the first connection adapter.

Referring to step 1406, portions of one or more distal ends of the one or more pipe stubs are removed to form one or more open-ended pipe stubs. The portions may be removed any number of ways without departing from the scope of the present invention. For example, the distal ends may be removed via mechanical cutting or sawing. Additionally or alternatively, one or more of the distal ends may include separate, distinct cap pieces that can be removed. This step may be performed prior to one or more of the aforementioned steps without departing from the scope of the present invention. For example, this step may be performed prior to putting the connection adapter in fluid communication with the tank (e.g., seating it in the bottom gasket), prior to rotating the first connection adapter so that its pipe stubs extend in the desired directions, and/or prior to tightening the bottom gasket coupled to the first connection adapter.

Referring to step 1408, piping is inserted into the one or more pipe stubs. This may include placing one or more couplers on exterior surfaces of the one or more pipes stubs and inserting the piping into the couplers and pipe stubs. Clamping systems, such as worm clamps, on the couplers may be tightened to secure the couplers to the pipe stubs and piping. This step may include inserting singular pieces of piping through the couplers and pipe stubs, and then connecting ends of the singular pieces within the connection adapter to suitable piping that extend into the first tank.

Referring to step 1410, a second connection adapter may be positioned in fluid communication with a second tank. The second connection adapter and second tank may be substantially similar to the connection adapters and tanks described elsewhere herein. In one or more embodiments, this step includes positioning the second tank in place. The second tank may be connected to the first tank so that they are in fluid communication. This step may further include placing a gasket on the accessway neck of the tank and placing the second connection adapter in the gasket. Additionally or alternatively, this step may include coupling a riser section to the accessway neck of the tank, placing the gasket on the riser section, and placing the second connection adapter in the gasket. The second connection adapter may be positioned at a different elevation than the first connection adapter.

Referring to step 1412, the second connection adapter is positioned so that the one or more pipe stubs thereof extends in a second direction that is different than the first direction. This allows for the pipe stubs of the second connection adapter to face on-site piping that extends from a different direction than the first connection adapter. This enables building tank systems in-situ and/or adding onto an existing tank system.

The method 1400 may include additional, less, or alternate steps and/or device(s), including those discussed elsewhere herein. For example, portions of one or more distal ends of the one or more pipe stubs of the second connection adapter may be removed to form one or more open-ended pipe stubs. Additionally, one or more couplers may be placed on exterior surfaces of the pipes stubs of the second connection adapter, and piping may be inserted into the couplers and pipe stubs of the second connection adapter. Accordingly, clamping systems, such as worm clamps, on the couplers connected to the second connection adapter may be tightened.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A connection adapter for incorporating in a riser stack of an underground tank, the connection adapter comprising:
- a first portion having a bottom end and a top end opposite the bottom end, the bottom end having an outer diameter sized to fit within an accessway of the underground tank;
- a flange portion connected to the top end of the first portion; and
- one or more pipe stubs in fluid communication with the first portion and externally protruding from the first portion, the one or more pipe stubs being integrally formed with the first portion and having an integrally formed distal end wall that caps the one or more pipe stubs,
- wherein the flange portion has an inner diameter that is greater than an inner diameter of the first portion.

2. The connection adapter of claim 1, wherein the first portion, the one or more pipe stubs, and the flange portion are of unitary construction.

3. The connection adapter of claim 1, wherein the first portion is a first cylindrical portion, and the flange portion includes a bottom end connected to the top end of the first cylindrical portion, and a top end opposite the bottom end, further comprising a second cylindrical portion extending from the top end of the flange portion.

4. The connection adapter of claim 3, wherein the second cylindrical portion has an inner diameter that is shorter than the inner diameter of the flange portion.

5. The connection adapter of claim 4, further comprising:
- a bottom gasket having a bottom end sized to receive a neck of the accessway and a top end sized to receive the bottom end of the first cylindrical portion; and
- a top gasket having a bottom end sized to receive the second cylindrical portion.

6. The connection adapter of claim 1, wherein the one or more pipe stubs comprises three or more pipe stubs.

7. The connection adapter of claim 6, wherein at least one of the three or more pipe stubs has an inner diameter that is shorter than inner diameters of the other ones of the three or more pipe stubs.

8. The connection adapter of claim 6, wherein the three or more pipe stubs extend parallel to one another from the first portion.

9. A tank system comprising:
- a first tank having a top end with an accessway neck extending from the top end and defining an accessway opening;
- a first connection adapter coupled to the accessway opening, the first connection adapter comprising:
  - a cylindrical portion having a bottom end and a top end opposite the bottom end, the bottom end having an outer diameter sized to fit within the accessway opening of the first tank;
  - a flange portion connected to the top end of the cylindrical portion; and
  - one or more pipe stubs in fluid communication with the cylindrical portion and externally protruding from the cylindrical portion in a first direction, the one or more pipe stubs having a distal end that is capped;

a second tank having a top end with an accessway neck extending from the top end and defining an accessway opening, the second tank operable to be in fluid communication with the first tank via piping; and a second connection adapter coupled to the accessway opening of the second tank, the second connection adapter comprising:

a cylindrical portion having a bottom end and a top end opposite the bottom end, the bottom end having an outer diameter sized to fit within the accessway opening of the second tank;

a flange portion connected to the top end of the cylindrical portion of the second connection adapter; and one or more pipe stubs in fluid communication with the cylindrical portion of the second connection adapter and externally protruding from the cylindrical portion of the second connection adapter, the one or more pipe stubs of the second connection adapter having a distal end that is capped, wherein the second connection adapter is oriented relative to the second tank so that the one or more pipe stubs of the second connection adapter extends in a second direction that is different than the first direction.

10. The tank system of claim 9, further comprising a first riser section connected to the flange portion of the first connection adapter.

11. The tank system of claim 10, further comprising a second riser section positioned between the accessway neck of the second tank and the second connection adapter.

12. The tank system of claim 9, wherein the first connection adapter includes an open-ended pipe stub in fluid communication with the cylindrical portion of the first connection adapter and externally protruding from the cylindrical portion of the first connection adapter, further comprising piping extending through the open-ended pipe stub into the first tank.

13. The tank system of claim 12, further comprising one or more flexible couplers with a first end that receives the open-ended pipe stub and a second end that receives the piping.

14. A method of installing one or more water reclamation tanks, the method comprising:

positioning a first connection adapter in fluid communication with a first tank, wherein:

the first tank has a top end with an accessway neck extending from the top end and defining an accessway opening, and the first connection adapter comprises:

a cylindrical portion having a bottom end and a top end opposite the bottom end;

a flange portion connected to the top end of the cylindrical portion; and one or more pipe stubs in fluid communication with the cylindrical portion and externally protruding from the cylindrical portion, the one or more pipe stubs having a distal end that is capped;

positioning the first connection adapter so that the one or more pipe stubs thereof extends in a first direction;

removing a portion of the distal end of the one or more pipe stubs;

inserting piping into the one or more pipe stubs;

positioning a second connection adapter in fluid communication with a second tank, wherein:

the second tank has a top end with an accessway neck extending from the top end and defining an accessway opening, and the second connection adapter comprises:

a cylindrical portion having a bottom end and a top end opposite the bottom end;

a flange portion connected to the top end of the cylindrical portion; and one or more pipe stubs in fluid communication with the cylindrical portion and externally protruding from the cylindrical portion, the one or more pipe stubs having a distal end that is capped; and positioning the second connection adapter so that the one or more pipe stubs thereof extends in a second direction that is different than the first direction, wherein positioning the first connection adapter comprises placing the first connection adapter in a gasket coupled to the accessway neck of the first tank.

15. The method of claim 14, wherein positioning the second connection adapter comprises placing the second connection adapter in a gasket coupled to a riser section that is coupled to the second tank.

16. The method of claim 14, further comprising placing a coupler around exterior surfaces of the one or more pipe stubs and the piping.

* * * * *